US005285218A

United States Patent [19]

Tanaka

[11] Patent Number: 5,285,218

[45] Date of Patent: Feb. 8, 1994

[54] AUTOMATIC LEAD FEED APPARATUS IN AN AUTOMATIC DRAFTING APPARATUS

[75] Inventor: Kuniaki Tanaka, Tokyo, Japan

[73] Assignee: Mutoh Industries, Ltd., Tokyo, Japan

[21] Appl. No.: 603,023

[22] Filed: Oct. 26, 1990

[30] Foreign Application Priority Data

Nov. 30, 1989 [JP] Japan ................................ 1-311905
Nov. 30, 1989 [JP] Japan ................................ 1-311906
Nov. 30, 1989 [JP] Japan ................................ 1-311907

[51] Int. Cl.$^5$ ........................ G01D 15/16; B43L 13/00
[52] U.S. Cl. .................................. 346/139 R; 33/18.1
[58] Field of Search ........................ 346/139 R, 139 C; 33/18.1, 18.2; B43L 13/00

[56] References Cited

U.S. PATENT DOCUMENTS 4,905,016 2/1990 Kobayashi et al. ........ 346/139 R X
4,991,300 2/1991 Takahashi ........................... 33/18.2
5,179,393 1/1993 Takahashi ....................... 346/139 R

FOREIGN PATENT DOCUMENTS 0288497 11/1989 Japan .
0288499 11/1989 Japan .................................. 33/18.1
0317790 12/1989 Japan .................................. 33/18.1

*Primary Examiner*—Benjamin R. Fuller
*Assistant Examiner*—Alrick Bobb
*Attorney, Agent, or Firm*—Wenderoth, Lind & Ponack

[57] ABSTRACT

A pen holding arm connected to an elevation drive apparatus of a pen head of an automatic lead feed apparatus holds a pen or a writing instrument. The automatic lead feed or supply apparatus has a lead reservoir at one side of an automatic drafting machine provided with the lead feed apparatus, a lead feed shutter drops the lead contained in the lead reservoir one by one. The shutter is controlled to open and shut by a driving force of the pen head. The driving force gives a rotary oscillation and vertical oscillations to the lead reservoir, so that the lead smoothly drops from the lead reservoir into the instrument situated just below the reservoir. The lead is led in depth into the writing instrument by vertical driving of the elevation drive apparatus.

7 Claims, 4 Drawing Sheets

AUTOMATIC LEAD FEED APPARATUS IN AN AUTOMATIC DRAFTING APPARATUS

TECHNICAL FIELD OF THE INVENTION

This invention concerns an automatic lead feed apparatus for automatically feeding or supplying writing leads to a pencil pen, or a writing instrument of an automatic drafting machine.

PRIOR ART

Japanese Laid-open Patent Application No.63-260495 describes an automatic lead feed apparatus. A lead dropping port provided at a lower portion of a lead tank or reservoir is opened by a shutter mechanism in order to drop one lead in the lead tank or reservoir into a pencil pen positioned under the lead tank. A knock mechanism of the well-known pencil pen is then knocked by a knocking device consisting of a solenoid placed at the machine side, and consequently the lead dropped in the pencil pen or writing instrument is fed or supplied to a chuck mechanism within the pencil pen.

According to the conventional automatic lead feed apparatus mentioned above, it is necessary to separately place the knock drive mechanism for driving the knock mechanism of the pencil pen or writing instrument on the machine body as well, resulting in a complicated and large structure of the machine as a high cost.

Consequently, it is a first object of the present invention to provide an automatic lead feed apparatus in an automatic drafting machine solving the above shortcoming.

Japanese Laid-open Patent Application No.1-136797 describes an automatic writing lead feed apparatus of an X-Y plotter, which comprises a lead tank arranged at a machine side, a lead guide elevatably arranged at a bottom portion of the lead tank, a rockably supported rockable plate having a lead drop hole formed at the lower portion of the lead guide and, a pen head for pushing the rockable plate in order to make the lead drop hole correspond to a bottom end of the lead guide and to drop the lead in the guide to the writing instrument through the lead drop hole. When the rockable plate is pushed by the pen head, the plate pushes the lead guide so as to extrude a predetermined length of an upper end of the lead guide from the bottom portion of the lead tank resulting in a guidance of one lead among several leads in the lead tank into the lead guide.

According to the conventional automatic lead feed apparatus of Japanese Laid-open Patent Application No.1-136797, when plural leads contained in the lead reservoir converge upon the opening at the upper end of the lead guide at the bottom portion of the lead reservoir, the opening is stuffed with these leads disadvantageously resulting in the failure of the guidance of a single lead to the lead guide.

It is a second object of the present invention to provide an automatic lead feed apparatus of the X-Y plotter solving the above shortcoming of Japanese Laid-open Patent Application No. 1-136797.

DETAILED EXPLANATION OF THE PREFERRED EMBODIMENT

An embodiment of an automatic lead feed apparatus of an automatic drafting machine according to the present invention will be explained in detail with reference to the accompanying drawings.

Figure 1:
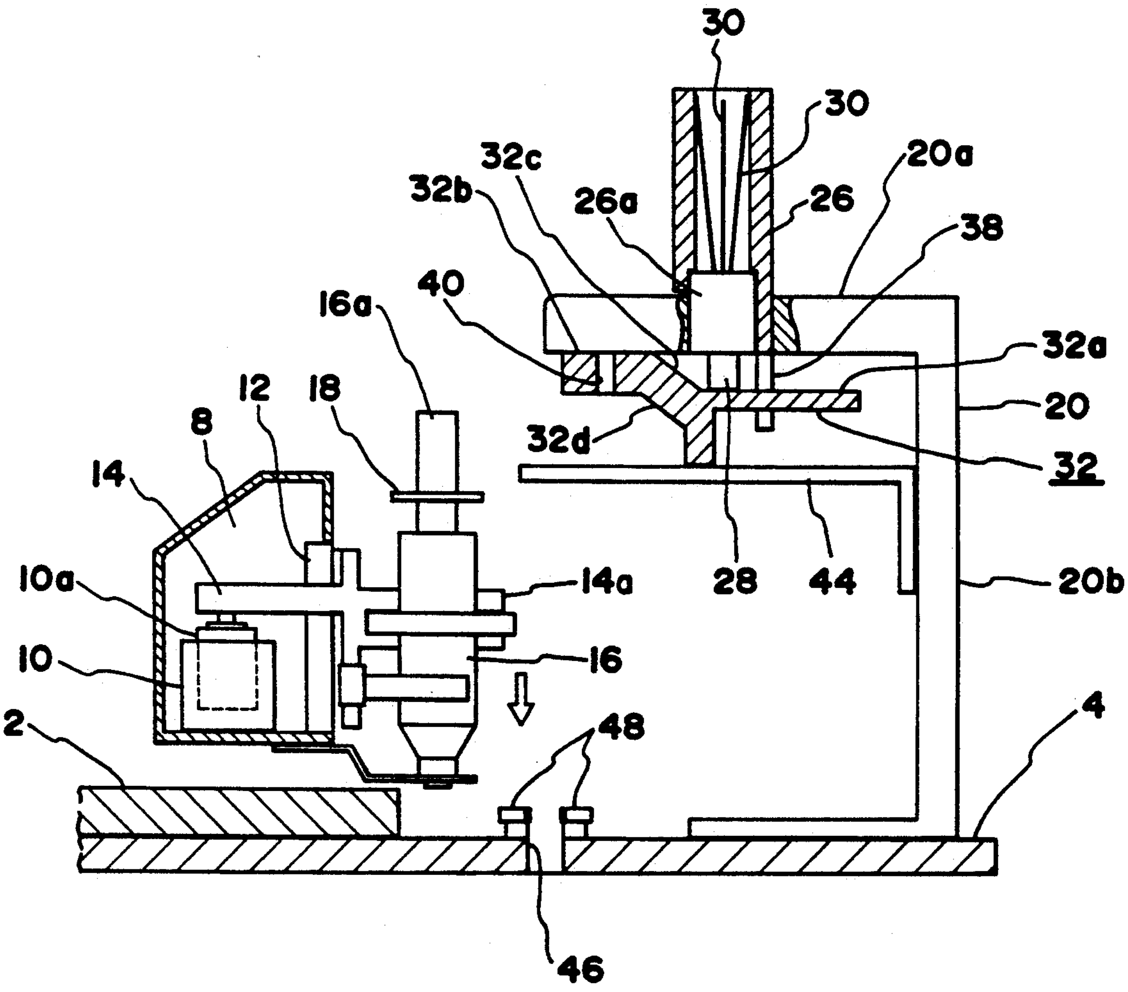
FIG. 1 is a side elevation, partly broken, of the automatic lead feed apparatus according to the present invention.
Figure 2:
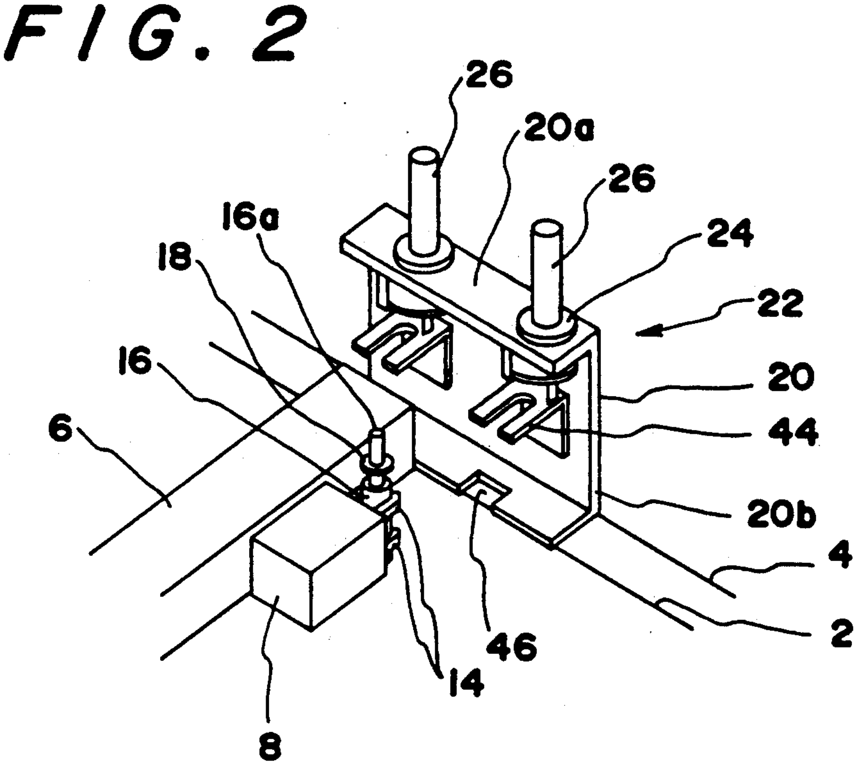
FIG. 2 is a perspective view of a portion of the apparatus of FIG. 1.
Figure 3:
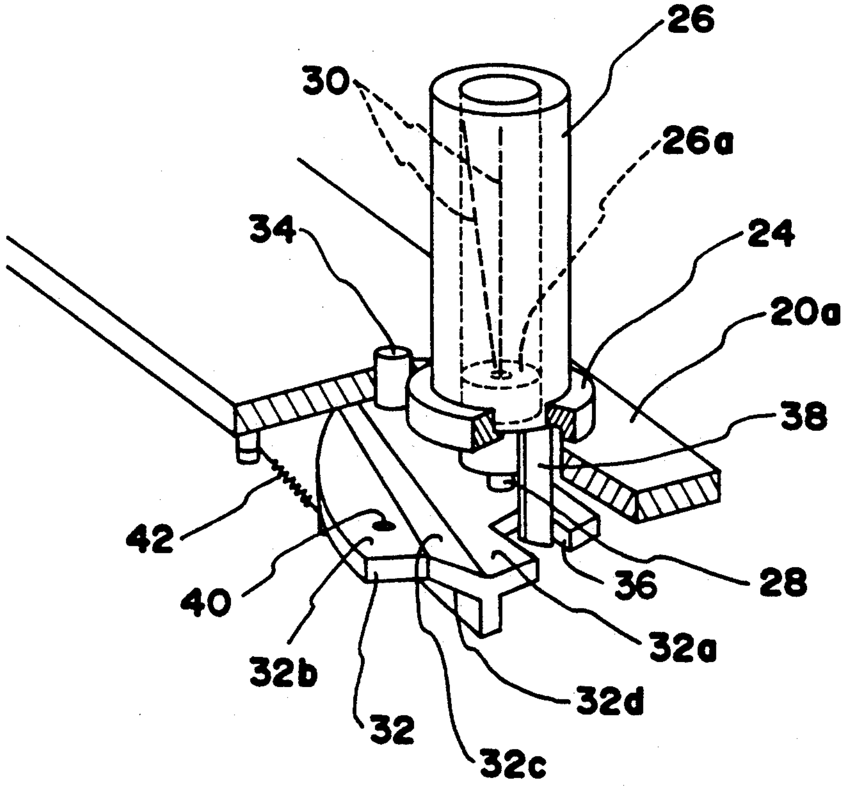
FIG. 3 shows a perspective view, partly broken, of the relationship between a lead tank and a supply lead shutter.

As shown in FIG. 2, a drawing board 2 is fixed to a machine body 4 of an automatic drafting machine, on the board 2 is supported a movement rail 6 so as to move in parallel with the X-axis. A pen head 8 is supported on the movement rail 6 so as to move along the rail 6. As shown in FIG. 1, an elevation drive apparatus 10 consisting of a wellknown moving coil mechanism is secured to a base board of the pen head 8. An elevation member 14 is elevatably connected to a column 12 standing on the base board of the pen head 8 through a linear stroke bearing. A pen holding arm **14*a* is secured to the elevation member 14, so that the pen holding arm 14*a* can removably hold a conventional pencil pen or writing instrument 16 provided with a knock mechanism 16*a* and a chuck mechanism gripping the lead. The knock mechanism 16*a* opens a chuck portion of the chuck mechanism and is placed on the upper portion of the writing mechanism 16. The knock mechanism 16*a* of the writing instrument 16 elastically protrudes upward from the top end of a pen case of the instrument 16. A flange portion 18 is secured to the knock mechanism 16*a*. The knock mechanism 16*a* has an axial hole formed therein to accept leads, and the axial hole opens at a center of the top end of the knock mechanism 16*a*. A lead reservoir holding or installation base 20 of an automatic lead supply apparatus 22 is secured to the machine body 4. Several lead reservoirs 26 are supported on an upper horizontal face 20*a* of the lead reservoir holding base 20 through securing rings 24 so as to rotate around their predetermined positions. A bottom portion of the lead reservoir 26 has a cylindrical bottom member 26*a* secured thereto as shown in FIG. 3. Through an axial hole formed at the center of the bottom member 26*a*, there is a pipe-like lead guide 28 urged slidably downward. The lower end of the lead guide 28 protrudes by a predetermined length from the lower end of the bottom member 26*a* or from the lower face of the horizontal portion 20*a*. A lower open hole of the lead guide 28 forms a lead dropping hole of the lead reservoir 26. The lead reservoir 26 contains several leads 30, and they are adapted to be led to the lead guide 28 one by one. A lead feed shutter 32 is placed under the horizontal portion 20*a* and consists of a plate-like cam supported by a shaft 34 so as to rock in place parallel to the lower face of the horizontal portion 20*a*. The lead feed shutter 32 has a dent 36 formed at the opposite side of the shaft 34 centering rotation. An engagement arm 38 depending from the lead reservoir 26 fits with the dent 36. The lead feed shutter 32 has a lower horizontal face 32*a* and an upper horizontal face 32*b* formed thereon. Along the border between faces 32*a* and 32*b* is formed an upper taper face 32*c* of a predetermined length is formed. At a position of the lower face of the lead feed shutter 32 corresponding to the position of the upper taper face 32***c*, a lower taper face 32*d* is formed. The shutter 32 has a through hole 40 through which leads drop, and formed in the shutter 32 so as to open on the upper horizontal face 32*b*. The lead guide 28 is placed on a rocking track around the shaft 34. The shutter 32 is urged toward a predetermined rotational direction due to a spring 42, and the shutter 32 is engaged with a stopper (not shown) formed on the upper horizontal portion 20*a* of an installation base 20. A knocking arm 44 provided with a forked portion is secured to a vertical portion 20*b* of the installation base 20 so as to be placed under the lead reservoir 26. The machine body 4 has a remaining lead discharge port 46 situated below the knocking arm 44, and the discharge port 46 has a sensor 48 for detecting the dropping of remaining leads. Motion of the movement rail 6 in the X-axis direction along the drawing board 2 movement of the pen head 8 in the Y-axis direction along the movement rail 6, and elevation of an output body 10*a* of the elevation drive apparatus 10 in the Z-axis direction are controlled by a controller accepting drafting data of a host computer. It is possible to change the kind of lead reservoir installation base 20 to a rotary-type.

Next, an operation of the embodiment above will be explained with reference to the accompanying drawings.

Figure 4:
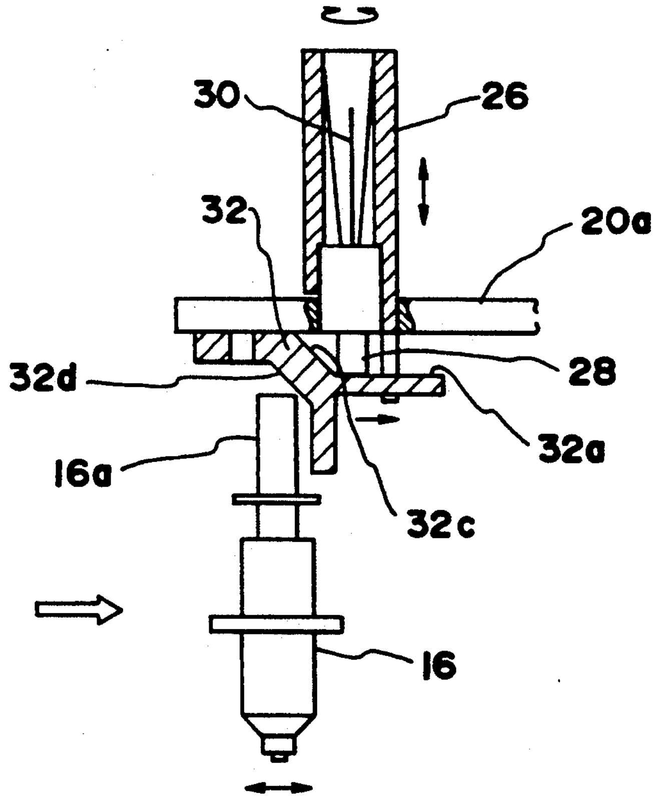
FIG. 4 is a side elevation of a portion illustrating lead supply operation.

When the controller detects that the writing instrument 16 held by the elevation member or pen holding arm 14 of the pen head 8 fails to have leads, the pen head 8 moves as shown in FIG. 1 toward the front a predetermined lead feed position, and the elevation drive apparatus 10 is driven to move the pen holding arm 14 to a predetermined level. Next, as shown in FIG. 4, the pen head 8 moves to a position at which the knocking mechanism 16*a* contacts the lower tapered face 32*d* of the shutter 32. Then, the pen head 8 reciprocally moves in the arrow direction of FIG. 4 with about a 1 mm stroke or the elevation drive apparatus 10 is driven to elevate or lower the writing instrument 16 several times in order to push the lower taper face 32*d* with the upper end of the instrument 16. An elevational movement of the writing instrument 16 or a horizontal reciprocal motion of the pen head 8 rocks the shutter 32 around the rotary shaft 34, resulting in a reciprocal and rockable rotation of the lead reservoir 26 in a horizontal plane in cooperation with the shutter 32. Simultaneously, the lead guide 28 reciprocates between the lower horizontal face 32 and the upper tapered face 32*c* of the shutter 32 and vertically rocks. As a result, only one of the leads 30 contained in the lead reservoir 26 drops in the lead guide 28. When the lower end of the lead guide 28 contacts the lower horizontal face 32*a* of the lead supply shutter 32, the top end of the lead guide 28 is placed at the same level as that of the top face of the bottom member 26*a*. When the lower end of the lead guide 28 contacts the upper taper face 32*c* or the upper horizontal face 32*b* of the lead feed shutter 32, the top end of the lead guide 28 protrudes from the upper face of the bottom member 26*a*.

Figure 5:
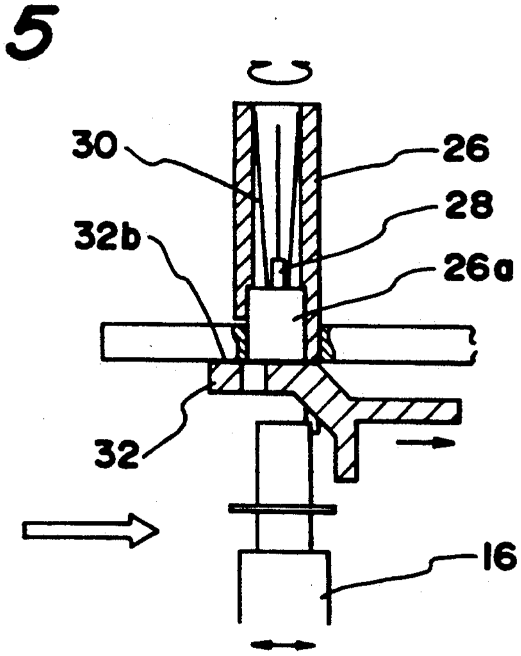
FIG. 5 is a view similar to FIG. 4.

Next, as shown in FIG. 5, the pen head 8 further moves, and the writing instrument 16 moves to the lead drop position, where the instrument 16 reciprocates horizontally with a stroke of about 1 mm. In place of the horizontal reciprocal motion, the writing instrument 16 elevate relative to the lower tapered face 32*d*. The lead guide 28 rides on the upper horizontal face 32*b* of the shutter 32, and the upper end of the lead guide 28 protrudes from the upper face of the bottom member 26*a* of the lead reservoir 26 in order to prevent other leads from being inserted to the lead guide 28.

Figure 6:
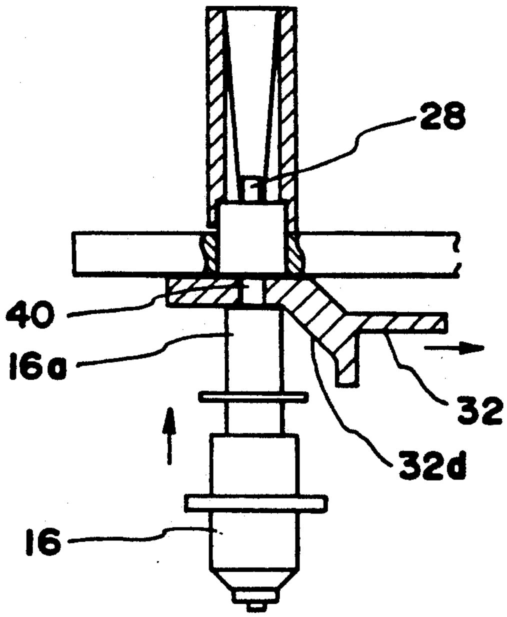
FIG. 6 is still another view similar to FIG. 4.
Figure 7:
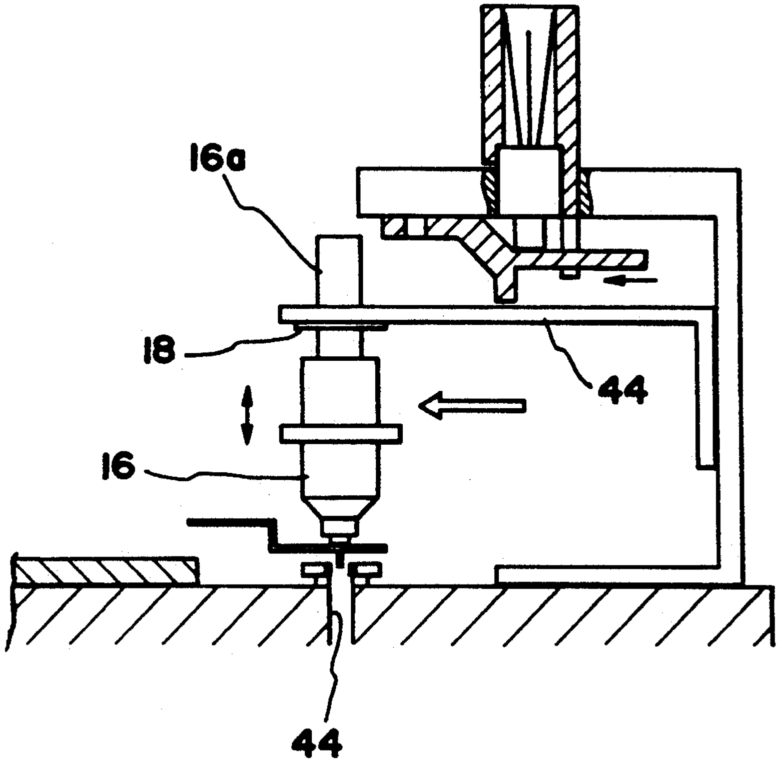
FIG. 7 is a side elevation depicting a discharging operation of remaining leads.

Together with a reciprocal and horizontal motion, or elevational motion of the pen or writing instrument 16, the shutter 32 reciprocally rotates, and simultaneously the lead tank 26 rotates and rocks or oscillates in a horizontal plane in order to shake off other leads 30 from the top face of the lead guide 28. Next, the writing instrument 16 stops at the lead dropping position, and the elevation drive apparatus 10 is driven so as to raise the writing instrument 16 by a predetermined height as shown in FIG. 6. Consequently, the top face of the knock mechanism 16*a* pushes up the lower tapered face 32*d* of the shutter 32, and the shutter 32 rotates to the predetermined position around the shaft 34. As a result, the lead insertion hole of the knock mechanism 16*a*, the lead dropping hole 40 of the shutter 32, and the lead dropping port of the lead guide 28, respectively, correspond to each other along the same axial line, and only one lead in the lead guide 28 drops into the axial hole of the knock mechanism 16*a*. Next, the controller moves the pen head 8 back and the lower end of the writing instrument 16 is placed, as shown in FIG. 7, just above the remaining lead discharge port 46. Then, the top face of the flange member 18 of the knock mechanism 16*a* is adjacent to the lower face of the forked portion of the knocking arm 44. Next, the controller elevates the elevation drive apparatus 10 so as to elevate several times the writing instrument 16 to vertically knock the flange member 18 relative to a lead case of the instrument 16 in order to pay out the new lead from the lead case and discharge the remaining lead in the lead case, dropping the remaining lead through the remaining lead discharge port 46.

It is noted that the knock mechanism of the writing instrument of the automatic lead feed apparatus according to the present invention is driven through the elevation drive apparatus of the pen head, so that no separate drive mechanism for driving the knock mechanism, installed in the automatic lead feed or supply mechanism portion at the machine side is necessary.

In addition, a driving force for the pen head is used, as described above, to vertically oscillate the lead guide in the lead reservoir, so that it is certain that one lead is guided into the lead guide. Further, there is no need to install any different oscillation drive mechanism in the automatic lead feed apparatus according to the present invention, so that it is possible to effectively miniaturize the size of the apparatus and lower the cost of the apparatus.

Still further, because the driving force of the pen head is used to oscillate or rock the lead reservoir along its rotational direction, it is possible to prevent leads from blocking the upper openings or holes of the lead dropping passage at the bottom portion of the lead reservoir of the automatic lead feed apparatus.

What is claimed is:

1. A lead feed apparatus in an automatic drafting machine having a drawing board, said lead feed apparatus comprising:

a writing instrument removably mounted on a pen holding arm, said pen holding arm cooperating with an elevational drive apparatus in a pen head that is movably mounted on the drawing board for elevational movement of said pen holding arm, and said writing instrument having a lead chuck mechanism including a chuck portion and a knock mechanism for opening said chuck portion;

a lead reservoir having a lower hole;

a shutter mechanism below said lead reservoir having a through hole therein, said shutter mechanism being movable from a closed position wherein said lower hole of said lead reservoir is closed by said shutter mechanism to an open position wherein said lower hole is aligned with said through hole of said shutter mechanism by engagement of said shutter mechanism by said writing instrument so as to drop one lead from said lead reservoir into said writing instrument; and a knocking arm on the drafting machine for engaging said knock mechanism when said knock mechanism is elevated by said elevational drive apparatus elevating said pen holding arm and said writing instrument to feed lead to said writing instrument.

2. The lead feed apparatus of claim 1, wherein:

said lead reservoir is vertically arranged on the drafting machine and has a lead guide vertically slidably fitted in a bottom portion thereof, said lead guide defining said lower hole;

said shutter mechanism has an upper tapered face thereon, is situated just below said lead guide, is oscillatingly mounted for horizontal movement, and said lead guide is engaged by said upper tapered face for vertical oscillation in response to horizontal movement of said shutter mechanism; and said writing instrument reciprocates said shutter mechanism to cause the horizontal movement of said shutter mechanism, whereby said lead guide is vertically oscillated such that an upper end of said lead guide protrudes from said bottom portion of said lead reservoir by a predetermined length so as to only feed one lead from said lead reservoir into said lead guide.

3. The lead feed apparatus of claim 1, wherein:

said lead reservoir is vertically arranged on said drafting machine and is rotatable about a central axis thereof;

said shutter mechanism is rotatably mounted and biased for rotation in a horizontal direction, is engaged with said lead reservoir such that said lead reservoir rotates about the central axis in response to rotation of said shutter mechanism, and has said through hole thereof aligned with said lower hole of said lead reservoir at a predetermined rotational position for dropping a lead therethrough; and said writing instrument is reciprocated vertically or horizontally by said pen head so as to reciprocably engage said shutter mechanism for horizontal movement of said shutter mechanism and thereby rotate said lead reservoir about the central axis over a predetermined angular range.

4. The lead feed apparatus of claim 1, wherein said knocking arm has a forked portion for receiving said knock mechanism.

5. The lead feed apparatus of claim 1, wherein said knock mechanism has a flange portion thereon for engaging said forked portion of said knocking arm.

6. The lead feed apparatus of claim 1, wherein said shutter mechanism has a lower slanted surface engaged by said writing instrument for movement of said shutter mechanism between said closed and open positions.

7. The lead feed apparatus of claim 6, wherein said shutter mechanism is horizontally rotatably mounted.

* * * * *